Patented Sept. 5, 1933

1,925,309

UNITED STATES PATENT OFFICE 1,925,309

MANUFACTURE OF CELLULOSE ESTERS

Henry Dreyfus, London, England

No Drawing. Application October 28, 1929, Serial No. 403,138, and in Great Britain November 21, 1928

19 Claims. (Cl. 260—101)

This invention relates to a new or improved process for the manufacture of cellulose esters of organic carboxylic acids and in particular cellulose acetates or higher fatty acid esters of cellulose.

It is well known that cellulose esters have in the past been produced by treating cellulose or its conversion products with organic acid chlorides in the presence of an organic base, for example pyridine. The high temperature necessary for this reaction coupled with the hydrochloric acid liberated by the reaction results in considerable degradation of the cellulose and a consequent diminution in the value for commercial purposes of the cellulose esters obtained. The present invention relates to a process in which cellulose or its conversion products or derivatives thereof containing one or more free hydroxy groups are esterified by means of anhydrides of carboxylic acids and particularly fatty acid anhydrides in presence of tertiary organic bases.

I have found that in order to effect such a reaction within a reasonable time it is necessary either during or before the esterification to treat the cellulose or other starting material with the organic base or bases or mixtures containing the same at temperatures above 100° C.

Accordingly therefore the present invention comprises a process for the production of cellulose esters in which cellulose or its conversion products or derivatives thereof containing one or more hydroxy groups, for example partially esterified or etherified products, are either treated with a liquid consisting of or containing a tertiary organic base at a temperature above 100° C. and thereafter esterified by means of the appropriate anhydride in presence of one or more tertiary organic bases, or the cellulose or the like is esterified by means of the anhydride in presence of the organic base or bases at a temperature above 100° C.

By adjusting the proportions of reagents or the conditions of the reaction, any desired degree of esterification may be attained. For example, the esterification may be carried to the di-ester stage or to the tri-ester stage or to an intermediate stage. Mixed esters may be produced by employing two or more anhydrides together or successively or by starting with a partially esterified cellulose.

Raw cellulose or cellulose which has been pretreated in any desired manner may be used as starting material. The cellulose may for example be treated with caustic alkali preferably under such conditions that while no serious degradation takes place any foreign matter present is removed, or the cellulose may be pretreated with organic and/or inorganic acids, for example formic acid, acetic acid or hydrochloric acid. Such pretreatments with organic or inorganic acids may for instance be carried out in the manner described in my French specification No. 565,654 or my United States patent applications S. Nos. 66,103 filed 31st October, 1925 and 328,306 filed 24th December, 1928. Inorganic acids should be removed before the actual esterification.

Wood pulps or other materials such as bamboo or esparto containing encrusting matter, from which lignin, pentosan, resin and like constituents have been substantially removed, as, for example, in soda pulp, sulphite pulp or sulphate pulp, may be esterified by the present process, but they are preferably first subjected to a pretreatment as described in my United States Patent specification No. 1,711,110, involving first subjecting them to an alkaline purifying treatment and then to a treatment with organic carboxylic acids. The alkaline purifying treatment may for example be effected with caustic alkali of low concentration, such as 3% or under, with heating or boiling, or with caustic alkali of higher concentration, such as 15-20%, in the cold or with only slight heating.

Fibres, fabrics or the like, for example of cotton or other natural cellulosic materials or of viscose artificial silk or other regenerated cellulosic artificial fibres, may be acetylated or esterified by the present processes, the esterification being conducted in the presence of non-solvent diluents or by means of gaseous reagents.

As stated above the esterification may either be conducted at temperatures above 100° C. or may follow a treatment of the cellulose or the like with the bases at a temperature above 100° C. Preferably even in the case of employing such a preliminary treatment with bases at above 100° C. the esterification itself is conducted at above 100° C. In either case the esterification may for example be conducted at temperatures of 140-200° C.

The organic bases to be employed according to the present invention should in general have boiling points above 100° C. as otherwise pressure will be necessary at some stage of the process. As indicated above they should be tertiary bases and therefore not capable of reacting with the acetic or other anhydride to form acetyl or acidyl amino compounds. Examples of suitable bases are: pyridine, N-alkyl or aryl piperidines, di-alkyl anilines or naphthylamines or homologues thereof, hexahydrodialkyl anilines and their homologues, dimethyl-n-hexylamine and isoamyl-diethylamine. The strong bases, such as N-alkyl piperidines, dialkylated aromatic bases and dimethyl-n-hexylamine are preferred. Aliphatic or other bases of lower boiling point may also be employed, for example in conjunction with organic diluents.

The acetylation or other esterification may be conducted in the presence of solvents and/or non-solvent diluents, e. g. toluene, xylenes or chlorbenzenes, for the cellulose esters. The esters are thus produced either in solution or so that they retain the original structure of the starting material. The preliminary treatment, if any, of the cellulose with the bases and/or the esterification is preferably carried out under a reflux condenser, but it may be effected under pressure. Alternatively the pretreatment with the bases and/or the esterification with the anhydrides and bases with or without solvents or diluents may be effected by means of the vapours of the reagents. Preferably the esterification is carried out in the presence of the organic base and the anhydride alone.

An important application of the processes of the present invention is for the production of relatively low acetylated or esterified celluloses for conversion into the higher acetylated or esterified products using catalysts, for example sulphuric acid or other mineral acids, acid salts for instance bisulphates or salts having a mineral acid reaction e. g. zinc chloride, ferric chloride and the like. The acetylation or esterification in presence of the tertiary organic bases may be carried to any desired stage short of the tri-ester stage, for instance to the mono- or die-ester stage or an intermediate stage, and the esterification completed according to known methods. Improved products are thus obtainable as compared with products obtained when acetylation or esterification is conducted throughout in the presence of catalysts. The conversion of the lower esterified products into the higher esterified celluloses may, for example, be effected by means of the processes described in United States Patent specification No. 1,708,787, and applications S. Nos. 301,928 filed 24th August, 1928, 301,929 filed 24th August, 1928, 301,927 filed 24th August, 1928, 321,750 filed 24th November, 1928, and 321,751 filed 24th November, 1928.

After acetylation or esterification according to the present invention the products may be separated from the reaction mixture in any desired manner, for example by decantation in the case of esterification in suspension. The esters produced are preferably subjected to secondary treatments for the purpose of conferring upon them other solubility characteristics which may be desirable for using them commercially. Such secondary treatments may be carried out in the primary esterification solutions or suspensions or the cellulose esters precipitated or separated from the primary reaction solutions or suspensions may be redissolved or resuspended for the purpose of carrying out the secondary reactions. In general the secondary treatments may be carried out with or without addition of inorganic or organic acids, acid salts, mineral acid salts of organic bases or other suitable agents for promoting the secondary treatment or reaction, the treatment being stopped when the required solubility has been reached. The secondary treatments may for instance be carried out as described in United States Patent application S. No. 378,807, filed 16th July, 1929, in suspension in a liquid, for example ether, in which water or similarly acting ripening agent is soluble or with which such a liquid is miscible to an appreciable extent or sufficiently to enable the ripening to be effected. Any acetic anhydride or other anhydride remaining in the esterification solution or suspension or in the primary ester may first be destroyed by adding water or any other anhydride destroying agent, such for instance as hydroxy derivatives or oxy acids (lactic acid, alcohols etc.) to the esterification solution or suspension or to the solutions or suspensions of the primary esters. Such added water, if desired, may be in an excess to effect the secondary treatment, or further water may be added, if desired together with acid or other ripening-promoting agents referred to above, after the anhydride is destroyed.

A further important feature of the present invention comprises a process of ripening or secondary treatment of such cellulose esters as those produced by processes described above in absence of mineral acids, mineral acid salts or salts or substances having a mineral acid reaction, e. g. zinc chloride.

According to this feature of the invention cellulose acetates or other cellulose esters produced in absence of mineral acids, mineral acid salts or salts or substances having a mineral acid reaction are treated with organic bases with or without water and/or organic acids for the purpose of changing their solubilities.

Such secondary treatments may be performed in the primary esterification suspensions or solutions or in suspensions or solutions of the primary esters after separation from the primary esterification solutions or suspensions. Any organic bases may be used for the purpose of the present invention, for example pyridine, N-alkyl or aryl piperidines, di-alkyl anilines or naphthylamines or homologues thereof, and hexahydro-dialkyl-anilines and their homologues, dimethyl-n-hexylamine, iso-amyl-diethyl-amine or other aliphatic bases. Other bases of lower boiling point may also be employed, for example in conjunction with organic diluents.

These bases are referred to above as being suitable for the actual acetylation or esterification process. In the process of secondary treatment or ripening however, owing to the fact that any excess of acetic or other anhydride may be destroyed as a preliminary to the ripening or secondary treatment, the choice of organic bases is not limited to compounds which do not react with acetic or other anhydride to form acetyl or acidyl amino compounds.

To effect this special ripening or secondary treatment, the primary acetate or other ester is heated for some time with the organic base, for example methyl piperidine or dimethyl-n-hexylamine, with or without water or organic acids, e. g. acetic acid, and with or without a diluent which may be either a solvent or a non-solvent for the cellulose esters. Instead of water a similarly acting ripening agent, such for instance as hydroxy derivatives or hydroxy acids (alcohols, lactic acid, etc.) may be employed. The ripening or secondary treatment will be stopped when a test sample shows that the required solubility has been reached.

This process of ripening or secondary treatment is particularly valuable when carried out in conjunction with the acetylation or esterification processes in presence of bases described above, since it is possible to proceed directly from the acetylation or esterification process therein described to the secondary treatment without separation of the cellulose ester from the esterification mixture and moreover at no stage of the process is the cellulosic material subjected to the action of substances having a mineral acid reaction.

The cellulose acetates or other cellulose esters produced according to the present invention, with or without secondary treatments may be employed for the production of artificial silks or fibres, films and the like by wet or dry-spinning processes. They may further be employed for the production of thermoplastic masses, moulding powders, or other compositions or articles or for any other purposes to which cellulose esters may be applied. If necessary or desirable plasticizing or softening agents or high boiling solvents may for this purpose be incorporated in the esters or in their solutions.

The following examples illustrate the invention but are not to be considered as limiting it in any way:—

Example 1

100 parts of viscose fibres are boiled under reflux with a mixture of 600 parts of acetic anhydride and 1000 parts of dimethyl-n-hexylamine, the boiling being continued until the desired acetyl content is obtained. After 5–15 hours the acetyl content is considerable and the product is very useful for conversion into cellulose tri-acetate by the methods known in the art employing as catalyst acids, acid salts or salts having an acid reaction. By continuing the boiling however, for example for 1–3 days, a cellulose acetate having an acetyl content corresponding substantially with the tri-acetate is obtained. The product may be separated from the reaction mixture in known manner or may be subjected directly to ripening or secondary treatment as described below in Examples 5 and 6. The highly acetylated primary products thus prepared, having an acetyl content of 56–62% calculated as acetic acid, swell strongly in chloroform and in tri-chlor-ethylene and may even dissolve in these solvents depending on the exact time taken for the acetylation, and also swell in organic bases generally.

Example 2

100 parts of cotton linters are boiled under reflux for 2–3 hours with 1000 parts of dimethyl-n-hexylamine. 600 parts of acetic anhydride are run in and the acetylation conducted by boiling under reflux as described in Example 1 above.

Example 3

100 parts of sulphate pulp are boiled for 1–2 hours with 2000–3000 parts of a solution of caustic soda of ¼–2½% strength. The material is removed from the lye, squeezed, washed thoroughly and then heated at 80–100° C. with 300–500 parts of glacial acetic acid for about 1–3 hours. It is then separated from the acid, hydro-extracted and air passed through the material until substantially all the acetic acid has been removed. The cellulosic material thus treated is introduced into a pressure vessel containing 600 parts of acetic anhydride and 1000 parts of methyl-piperidine and heated under pressure at 150–170° C. until the desired acetyl content has been attained. Highly acetylated products have similar properties to those given in Example 1 above.

Example 4

100 parts of cotton linters are boiled under reflux for 3–6 hours in a mixture of 300 parts of acetic anhydride and 500 parts of dimethyl-n-hexylamine. The material is then removed, hydro-extracted and introduced into an acetylator containing 250 parts of acetic anhydride, 600 parts of glacial acetic acid and 6 parts of sulphuric acid, the acetylation, and ripening if desired, being thereafter conducted in known manner.

Example 5

To the reaction mixtures of Examples 1, 2 and 3 containing a cellulose acetate of approximately the constitution of triacetate are added a mixture of 200 parts of glacial acetic acid with 100 parts of 20% hydrochloric acid. The whole is heated to a temperature of 50–60° C. The cellulose acetate successively develops a complete solubility in chloroform, if not already soluble, and solubilities in alcohol-chloroform, alcohol-benzene, acetone and acetone-water or acetone-alcohol. The reaction may be stopped when the desired solubility has been reached.

Example 6

To the reaction mixtures of Examples 1, 2 and 3 are added 280 parts of 70% acetic acid. The mixture is then boiled under reflux, the reaction being stopped, as in Example 5, when the desired solubility has been reached.

In a similar manner other cellulose esters may be made and treated. For example instead of acetic anhydride propionic anhydride or butryric anhydride may be employed.

What I claim and desire to secure by Letters Patent is:—

1. Process for the manufacture of cellulose esters, comprising treating materials consisting essentially of cellulose with lower fatty acid anhydrides and with tertiary organic bases, the cellulosic material being at some stage in contact with the base at a temperature above 100° C.

2. Process for the manufacture of cellulose esters, comprising esterifying materials consisting essentially of cellulose by means of lower fatty acid anhydrides in the presence of tertiary organic bases, the reaction being conducted at a temperature above 100° C.

3. Process according to claim 2 in which the cellulose esters produced are subjected to a ripening treatment for the purpose of changing their solubilities.

4. Process for the manufacture of cellulose esters, comprising esterifying materials consisting essentially of cellulose by means of lower fatty acid anhydrides in the presence of tertiary organic bases, the reaction being conducted at a temperature of 140°–200° C.

5. Process for the manufacture of cellulose acetate, comprising acetylating materials consisting essentially of cellulose by means of acetic anhydride in the presence of tertiary organic bases, the reaction being conducted at a temperature above 100° C.

6. Process according to claim 5 in which the cellulose acetate produced is treated with tertiary organic bases.

7. Process according to claim 5 in which the cellulose acetate produced is treated with tertiary organic bases, such treatment forming a continuous operation with the acetylation without intermediate separation of the acetate.

8. Process for the manufacture of cellulose esters, comprising pretreating materials consisting essentially of cellulose with tertiary organic bases and then esterifying them with lower fatty acid anhydrides in the presence of such bases, both processes being carried out at a temperature above 100° C.

9. Process for the manufacture of cellulose esters, comprising pretreating materials consisting essentially of cellulose with tertiary organic bases and then esterifying them with lower fatty acid anhydrides in the presence of such bases, the pretreatment process at least being carried out at a temperature above 100° C.

10. Process according to claim 9 in which the cellulose esters produced are treated with tertiary organic bases.

11. Process for the manufacture of cellulose esters, comprising pretreating materials consisting essentially of cellulose with a tertiary organic base having a boiling point above 100° C. and then esterifying them with lower fatty acid anhydrides in the presence of such base, at least one of these processes being carried out under reflux at a temperature above 100° C.

12. Process for the manufacture of cellulose acetate, comprising pretreating materials consisting essentially of cellulose with tertiary organic bases and then acetylating them with acetic anhydride in the presence of such bases, the pretreatment process at least being carried out at a temperature above 100° C.

13. Process according to claim 12 in which the cellulose acetate produced is treated with tertiary organic bases.

14. Process according to claim 12 in which the cellulose acetate produced is treated with tertiary organic bases, such treatment forming a continuous operation with the acetylation without intermediate separation of the acetate.

15. Process for the manufacture of cellulose acetate, comprising pretreating materials consisting essentially of cellulose with a tertiary organic base having a boiling point above 100° C. and then acetylating them with acetic anhydride in the presence of such base, at least one of the processes being carried out by boiling under reflux.

16. Process for the manufacture of cellulose esters, characterized in that materials consisting essentially of cellulose are partially esterified by means of lower fatty acid anhydrides in the presence of tertiary organic bases, the reaction being conducted at a temperature above 100° C., and the products are then further esterified in the presence of inorganic catalysts having an acid reaction.

17. Process for the manufacture of cellulose esters, characterized in that materials consisting essentially of cellulose are pretreated with tertiary organic bases, and then partially esterified with lower fatty acid anhydrides in the presence of such bases, the pretreatment process at least being carried out at a temperature above 100° C., and the resulting products are subsequently further esterified in the presence of inorganic catalysts having an acid reaction.

18. Process for the manufacture of cellulose acetate, characterized in that materials consisting essentially of cellulose are partially acetylated by means of acetic anhydride in the presence of tertiary organic bases, the reaction being conducted at a temperature above 100° C., and the products are then further acetylated in the presence of inorganic catalysts having an acid reaction.

19. Process for the manufacture of cellulose acetate, characterized in that materials consisting essentially of cellulose are pretreated with tertiary organic bases, and then partially acetylated with acetic anhydride in the presence of such bases, the pretreatment process at least being carried out at a temperature above 100° C., and the resulting products are subsequently further acetylated in the presence of inorganic catalysts having an acid reaction.

HENRY DREYFUS.